United States Patent [19]

Schlesinger

[11] 4,287,228
[45] Sep. 1, 1981

[54] PHOTOPOLYMERIZABLE EPOXIDE COATING COMPOSITIONS CONTAINING TITANIUM DIOXIDE PIGMENT AND METHOD OF POLYMERIZATION USING SAME

[75] Inventor: Sheldon I. Schlesinger, East Windsor, N.J.

[73] Assignee: American Can Company, Greenwich, Conn.

[21] Appl. No.: 122,883

[22] Filed: Feb. 20, 1980

[51] Int. Cl.$^3$ .............................................. B05D 3/06
[52] U.S. Cl. .................................. 427/54.1; 430/280; 430/914
[58] Field of Search ............... 427/54.1; 430/280, 914

[56] References Cited

U.S. PATENT DOCUMENTS

| | | | |
|---|---|---|---|
| 3,708,296 | 1/1973 | Schlesinger | 204/159.18 |
| 4,054,498 | 10/1977 | Tarwid | 204/159.11 |
| 4,107,353 | 8/1978 | Karoly et al. | 427/54.1 |

Primary Examiner—John H. Newsome
Attorney, Agent, or Firm—Robert P. Auber

[57] ABSTRACT

An epoxide coating composition which is relatively stable to ambient white light and activated upon exposure to ultraviolet light to produce a hard glossy coating includes a cationically polymerizable material consisting at least principally of an epoxide prepolymer. Also included are a titanium dioxide pigment and a photoinitiator component including a first photoinitiator compound selected from the class consisting of hexafluorophosphate, fluoroborate, fluoroantimonate or fluoroarsenate salts of the following diazonium compounds: 2,5-diethoxy-4-p-tolylmercaptobenzene diazonium, 4-chloro-2,5-dimethoxybenzene diazonium, 2,5-dimethoxybenzene diazonium, 2,5-dimethoxy-4-p-tolylbenzene diazonium and 2,5-dibutoxy-4-benzamidobenzene diazonium, and mixtures thereof. The preferred compositions additionally contain a second photoinitiator compound which is relatively stable to radiation having a wavelength of at least 355 nanometers and decomposable by radiation in the range of 200–355 nanometers. Coatings of the foregoing compositions containing certain epoxidic esters and epoxidic ethers are curable at ambient temperature to a hard glossy surface within one minute.

15 Claims, No Drawings

PHOTOPOLYMERIZABLE EPOXIDE COATING COMPOSITIONS CONTAINING TITANIUM DIOXIDE PIGMENT AND METHOD OF POLYMERIZATION USING SAME

BACKGROUND OF THE INVENTION

For a number of years the coating industry has been engaged in substantial developmental programs in the quest for procedures which would allow the coating of substrates at high production rates with the coating being cured to a tack-free condition at a speed commensurate with the contiguous processing steps. The industry has desired to eliminate the volatile solvents required in many of the well-known coating processes because of potential hazards or because of the cost of equipment to handle the evolved solvent vapors. In addition, the industry has been seeking coating formulations which would produce coatings which were durable and which would permit substantial additional processing of the workpiece, such as metal forming operations where the substrate is metal strip to be formed into container bodies, blanks and closures, or where plastic strip and paperboard are coated and to be formed.

Epoxy coating formulations have long been recognized as affording desirable properties in the finished coating, especially the toughness to withstand further processing. However, the problem has remained to develop a low cost epoxy coating formulation which would combine the desired rheological properties for the coating application with both reasonable pot life and rapid curing on the production line.

In Licari et al U.S. Pat. No. 3,205,157 granted Sept. 7, 1965 and Schlesinger U.S. Pat. No. 3,708,296, granted Jan. 2, 1973, there are described photopolymerizable epoxide formulations containing diazonium salts as photoinitiators which polymerize rapidly upon exposure to electromagnetic radiation to cure the formulations to provide durable coatings. In Watt U.S. Pat. No. 3,794,576, granted Feb. 26, 1974, there are described desirable epoxy formulations which combine the desired rheological properties with suitable pot life and rapid curing at ambient temperatures, by incorporation of a photoinitiator and at least about 15 percent by weight of epoxidic esters having two epoxycycloalkyl groups.

Since the disclosures of Schlesinger and Watt, a number of patents and publications have appeared proposing various photoinitiators for the epoxy formulations which could replace the diazonium catalysts specifically described in the Schlesinger and Watt Patents. Among these are the sulfonium salt catalysts disclosed in Smith U.S. Pat. No. 4,069,054 granted Jan. 17, 1978; Barton U.S. Pat. No. 4,090,936 granted May 23, 1978; and Crivello U.S. Pat. Nos. 4,069,055 granted Jan. 17, 1978 and U.S. Pat. No. 4,058,401 granted Nov. 15, 1977. Also proposed are the halonium salts described in Crivello U.S. Pat. No. 4,026,705 granted May 31, 1977.

Although the sulfonium salt compounds provide effective photoinitiators, the range of ultraviolet radiation to which the most commonly employed triphenyl sulfonium hexafluorophosphate compounds are sensitive is somewhat limited. More recently, it has been found that bis-alkyl/aryl bis-salts such as bis-[4-(diphenylsulfonio)-phenyl] sulfide bis-hexafluorophosphate compounds (BDS) and related fluoroborate, fluoroarsenate, and fluoroantimonate compounds are effective photoinitiators with a broader range of spectral sensitivity in the ultraviolet range. The method for making BDS-type photoinitiators and the use thereof in the cationic polymerization of epoxy compounds are disclosed and claimed in Watt U.S. patent application Ser. No. 20,240 filed Mar. 14, 1979, and Chang U.S. patent application Ser. No. 20,514 filed Mar. 14, 1979, now U.S. Pat. No. 4,197,174, granted Apr. 8, 1980.

As is well known, it is frequently desirable to provide pigmentation in the coating for aesthetic purposes. This pigmenting material may interfere with the photopolymerization process by reason of its absorption of light waves in the activating spectral range. This is particularly acute in the case of photopolymerizable white colored compositions containing titanium dioxide as the pigmenting material.

When the more common diazonium catalysts and the more recent sulfonium catalysts are employed to cure a titanium dioxide pigmented composition, the resultant coatings exhibit a wrinkled surface appearance and frequently fail to cure adequately below the surface. It is believed that the photoinitiator at the surface, when activated by the radiation, cures the surface rapidly while the resinous composition below the surface lags far behind in curing due to the absorption of all or most of the radiation of the wavelength needed for activation. The resultant distortion of the coating between surface and body produces the wrinkled condition.

In Tarwid U.S. Pat. No. 4,054,498 granted Oct. 18, 1977, there is disclosed a photopolymerizable epoxide coating composition which develops good gloss and which contains the epoxidic esters having at least two epoxycycloalkyl groups of the aforementioned Watt Patent, substantial amounts of an aluminum oxide coated titanium dioxide pigment and 2,5-diethoxy-4-(p-tolylmercapto)benzene diazonium hexafluorophosphate. Although this photoinitiator has a spectral sensitivity which avoids excessive reduction due to the absorption of light rays by the pigment, compositions utilizing it also exhibit some sensitivity to ambient white light and a tendency to prematurely cure when so exposed.

Accordingly, it is an object of the present invention to provide a novel photoinitiatable cationically polymerizable white pigmented epoxide coating composition utilizing a novel photoinitiator component, which composition evidences greatly reduced or eliminated tendency towards premature curing under ambient white light but which rapidly cures upon exposure to activating ultraviolet radiation.

It is also an object to provide such a composition which is relatively stable during extended periods of storage prior to exposure to light and which will nevertheless polymerize rapidly upon exposure to electromagnetic radiation of below about 400 nanometers (4000 Angstroms) to produce coatings with desirable mechanical and aesthetic properties.

Another object is to provide a novel coating process using such a white coating composition and which is adaptable to a wide variety of high speed coating lines and which does not require extensive or expensive equipment to effect photopolymerization of the applied coating.

SUMMARY OF THE INVENTION

It has now been found that the foregoing and related objects may be readily attained in a photopolymerizable coating composition containing 54.7–89.7 percent by weight of a cationically polymerizable epoxide prepolymer material, and 10-45 percent of titanium dioxide pigment. There is incorporated 0.3-10.0 percent by weight of a photoinitiator component which readily decomposes upon exposure to ultraviolet radiation to generate a Lewis acid to initiate polymerization of the cationically polymerizable epoxide material but which is relatively stable to ambient white light. The photoinitiator component includes a first photoinitiator compound comprising an aryl diazonium salt wherein the aryl diazonium group is selected from the class consisting of 2,5-diethoxy-4-p-tolylmercaptobenzene diazonium, 4-chloro-2,5-dimethoxybenzene diazonium, 2,5-dimethoxybenzene diazonium, 2,5-dimethoxy-4-p-tolylbenzene diazonium, 2,5-dibutoxy-4-benzamidobenzene diazonium, and mixtures thereof. The salt group of the photoinitiator is selected from the class consisting of hexafluorophosphates, fluoroborates, fluoroantimonates, fluoroarsenates, and mixtures thereof.

The preferred compositions include a second photoinitiator compound relatively stable to electromagnetic radiation in the wavelength of at least 355 nanometers and decomposable by ultraviolet radiation in the wavelength of 200-355 nanometers. These compounds are desirably selected from the class consisting of aryl diazonium salts, diaryl diazonium salts alkyl/aryldiazonium salts, salts, aryl/alkylsulfonium salts, bis-(aryl/alkylsulfonium) bis-salts, and mixtures thereof, with the salt groups being as described for the first photoinitiator compound. When the two classes of photoinitators are employed in combination, the second photoinitiator is employed in a molar ratio of 0.5-4.0:1.0 relative to the first photoinitiator, and most desirably 2.0-3.0:1.0.

The polymerizable material most desirably employed in accordance with the present invention is one which includes at least 25 percent of one or more of three different classes of epoxide prepolymers which are curable at ambient temperature. The first class comprises epoxide ethers having the following structural formula:

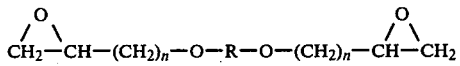

wherein $n=1-3$ and wherein R is an aliphatic or cycloaliphatic group having 5-12 carbon atoms. The second comprises epoxycarbocyclic ethers having the structural formula:

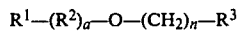

wherein $R^1$ is an epoxycarbocyclic group having 4-12 carbon atoms in its ring structure which may be mononuclear or polynuclear; wherein $R^2$ is a $C_1-C_3$ alkyl group; wherein $R^3$ may be the same as $R^1$ or an epoxy group having the following general structural formula:

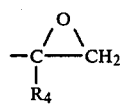

wherein $R^4$ may be hydrogen, a $C_1-C_3$ alkyl group or a phenyl group, and such alkyl and phenyl groups may be substituted or unsubstituted; wherein $a=0$ or 1; and wherein $n=1-3$. The third comprises epoxidic esters having at least two epoxycycloalkyl groups.

Most desirably, the titanium dioxide pigment comprises rutile titanium dioxide particles coated with aluminum oxide.

In the method of coating of the present invention, the several components are admixed to provide a polymerizable composition which is coated onto a substrate, and the coating is then exposed to ultraviolet radiation to decompose the photoinitiator component and to generate a Lewis acid to polymerize the polymerizable material. As a result, the epoxide composition is polymerized to a tack-free surface condition within 1 minute when the ambient temperature curing epoxide components are included, and the surface of the polymer produced thereby is hard and glossy. The period of exposure to the activating radiation is within the range of two to twenty seconds.

DETAILED DESCRIPTION OF THE PREFERRED EMBODIMENT

As previously indicated, the compositions of the present invention essentially comprise a mixture of a cationically polymerizable epoxide material, a photoinitiator component, and the titanium dioxide pigment. Upon exposure to ultraviolet radiation, the photoinitiator component decomposes to initiate polymerization of the cationically polymerizable epoxide material.

The Polymerizable Epoxide Materials

The cationically polymerizable materials which may be used herein comprise epoxidic prepolymer materials either as the sole polymerizable material or as the principal polymerizable constituent. Various other organic monomers are also known to be cationically polymerizable and may comprise a minor proportion of the cationically polymerizable material. Such vinyl organic monomers include vinylidene aromatic hydrocarbons such as styrene; vinylethers such as isobutyl vinylether and n-octyl vinylether; acrolein; vinylarenes such as 1-vinylpyrene and acenaphthalene; vinyl cycloaliphatics such as vinyl cyclohexane; conjugated dienes such as isobutylene, butadiene and isoprene. In addition, cyclic ethers such as oxetanes and oxolanes (e.g., tetrahydrofuran and trioxane), may be employed. Other groups of compounds comprise the cyclic esters such as the beta-lactones, e.g., propiolactones; and cyclic amines such as 1,3,3,-trimethyl azetidine. Another class of cationically polymerizable materials comprises cyclic organosilicon compounds such as hexamethyl trisiloxane. Still another class of materials which can be used as the cationically polymerizable material comprises thermosetting organic condensation resins of an aldehyde such as urea/formaldehyde resins, phenol/formaldehyde resins, melamine/formaldehyde resins, and the like, as described in Crivello U.S. Pat. No. 4,102,687 granted July 15, 1978.

Suitable cationically polymerizable materials are described at length in Pappas, "UV CURING: SCIENCE AND TECHNOLOGY", (Technology Marketing Corporation, Stamford, Conn.); Crivello U.S. Pat. No. 4,150,988; Crivello U.S. Pat. No. 4,102,687; and Crivello U.S. Pat. No. 4,069,056.

As previously indicated, the cationically polymerizable materials are comprised at least principally of epoxide prepolymer materials, and these may comprise any monomeric or oligomeric material containing at least one functional epoxy group or oxirane ring so that they may be polymerized upon opening of the oxirane ring. In addition, polymeric epoxy materials may be employed if they may be dispersed in the composition and are capable of undergoing further polymerization or cross linking to produce a solid polymer. The epoxy compounds may be aliphatic, cycloaliphatic, aromatic or heterocyclic. The epoxidic prepolymer should contain no functional groups more basic than the oxirane ring and should be a solvent for the initiator as well as a dispersing medium for the titanium dioxide pigment. Most desirable, the prepolymer should contain a resonable percentage of epoxy compounds containing two or more epoxy groups per molecule.

The polymerizable epoxide material will comprise epoxide resins used either singly or in combination and will have an average epoxide value of about 0.1–1.0. The carbon chains having the epoxy groups may include additional substituents including ethers, esters, halogens, phosphates, and the like, and the compounds may include other polymerizable functional groups such as acrylates and silicones.

Typical epoxy materials are readily available commercially, the most common being those which are the product of bis-phenol A with epicholorohydrin or those resulting from the reaction of epichlorohydrin with a phenol/formaldehyde resin of relatively low molecular weight. Reference may be made to the HANDBOOK OF EPOXY RESINS by H. Lee and K. Neville (McGraw-Hill 1967) for various epoxides. In addition, the technical literature and patent literature both contain extensive discussions of various epoxidic prepolymer materials which are useful in the compositions of the present invention as will be demonstrated hereinafter.

In the aforementioned Watt U.S. Pat. No. 3,794,576, there are described radiation-sensitive epoxidic blends containing at least about 15 percent by weight of an epoxidic ester having at least two epoxycycloalkyl groups per molecule in order to achieve rapid polymerization and curing of the composition at ambient temperatures upon exposure to ultraviolet radiation or the like. Such compounds are conveniently esters of an epoxidized cyclic alcohol and an epoxidized cycloalkanecarboxylic acid or esters of an alkylsubstituted (epoxycycloalkane)methanol and a dibasic acid. A number of suitable compounds are disclosed in the aforementioned Watt Patent, and compositions of this type have been employed in commercial coating formulations.

More recently, it has been discovered that certain epoxide ethers will also provide ambient temperature curing compositions when included in an amount of at least 25 percent by weight of the polymerizable epoxide material. Such compounds may comprise epoxycarbocyclic ether compounds having the structural formula:

$$R^1-(R^2)_a-O-(CH_2)_n-R^3$$

wherein $R^1$ is an epoxycarbocyclic group having 4–12 carbon atoms in its ring structure which may be mononuclear or polynuclear; wherein $R^2$ is a $C_1$–$C_3$ alkyl group; wherein $R^3$ may be the same as $R^1$ or an epoxy group having the following general structural formula:

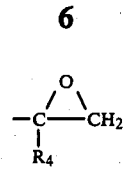

wherein $R^4$ may be hydrogen, a $C_1$–$C_3$ alkyl group or a phenyl group, and such alkyl and phenyl groups may be substituted or unsubstituted; wherein a=0 or 1; and wherein n=1–3.

A second class of ambient temperature curing epoxide ethers has the following structural formula:

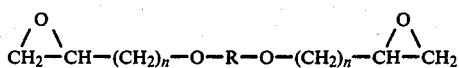

wherein n=1–3 and wherein R is an aliphatic or cycloaliphatic group having 5–12 carbon atoms.

Photopolymerizable epoxide compositions containing these two classes of ambient temperature curing epoxide ethers are disclosed and claimed in the copending applications of Anthony J. Tortorello, filed Nov. 23, 1979, under Ser. No. 096,633 and filed Nov. 26, 1979, under Ser. No. 097,399, respectively. Reference may be had thereto for further description, and the disclosures thereof are incorporated herein by reference.

The preferred compositions of the present invention utilize the Watt epoxycycloalkyl esters or the Tortorello ethers, or both, to provide ambient curing characteristics. These compounds comprise at least 25 percent by weight of the polymerizable material and preferably at least 35 percent.

Although not essential and sometimes undesirable, the polymerizable epoxy composition may contain diluents to improve viscosity, and these diluents may be reactive such as those produced by reaction of an alcohol or a phenol with epichlorohydrin. Exemplary of reactive diluents is the reaction product of nonylphenol with epichlorohydrin. The amount of diluent may vary from zero to as much as 45 percent of the polymerizable material if a reactive diluent is employed and is preferably less than 15 percent if nonreactive diluents such as dibutylphthalate are employed.

The Photoinitiator Component

The photoinitiator components of the present invention must include a photosensitive compound from the class set forth in Table One and which have been found to provide a high degree of sensitivity to ultraviolet radiation in a wavelength which is not strongly absorbed by the titanium dioxide pigment:

TABLE ONE

| INDEPENDENTLY EFFECTIVE PHOTOINITIATORS | |
|---|---|
| Compound | Wavelength, Abs. λ Max, nm. |
| 2,5-diethoxy-4-p-tolylmercaptobenzene diazonium hexafluorophosphate | 247, 357, 397 |
| 4-chloro-2,5-dimethoxybenzene diazonium hexafluorophosphate | 287, 392 |
| 2,5-dimethoxybenzene diazonium hexafluorophosphate | 271, 410 |
| 2,5-dimethoxy-4-p-tolylbenzene diazonium hexafluorophosphate | 405 |
| 2,5-dibutoxy-4-benzamidobenzene diazonium hexafluorophosphate | 330, 390 |

In place of the hexafluorophosphate group which is preferred, other salt groups may be employed to provide the desired Lewis Acid upon photodecomposition, namely fluoroborates, fluoroantimonates and fluoroarsenates. Of these other salt groups which are described in the literature, fluoroborates are considered to be most useful.

Although the photoinitiators in Table One are effective to produce rapid ambient temperature polymerization of epoxide coating compositions containing the epoxide esters of the aforementioned Watt U.S. Pat. No. 3,794,576, or the epoxide ethers of the aforementioned copending Tortorello applications, they do demonstrate a noticeable degree of sensitivity to ambient white light that could reduce their pot life in some commercial coating and applicating equipment. However, since they demonstrate ambient stability for periods of thirty minutes and more, they are highly useful by themselves to initiate polymerization.

However, it has been found that the photoinitiators of Table One may be used in combination with photoinitiators which themselves are not effective to produce desirable through curing of compositions containing titanium dioxide pigments. These auxiliary photoinitiators have a sensitivity to ultraviolet radiation of a wavelength below 355 nanometers, generally in the range 200-355 nanometers. The combination of the two classes of photoinitiators results in longer pot life for the compositions while retaining the desired rapid through curing characteristics. These auxiliary photoinitiator compositions are set forth in Table Two:

TABLE TWO
AUXILIARY PHOTOINITIATORS

| Compound | Wavelength, Abs. λ Max, nm. |
| --- | --- |
| 2,4-dimethoxybenzene diazonium hexafluorophosphate | 230, 330 |
| 3,4,5-trimethoxybenzene diazonium hexafluorophosphate | 355 |
| o-methoxybenzene diazonium hexafluorophosphate | not reported |
| 2-methyl-4-methoxybenzene diazonium hexafluorophosphate | 237, 313 |
| 3,4-methylenedioxybenzene diazonium hexafluorophosphate | not reported |
| 2-methyl-4-nitrobenzene diazonium hexafluorophosphate | 262, 319 |
| 5-chloro-2,4-dimethoxybenzene diazonium hexafluorophosphate | 298, 350 |
| 2-carboxymethylbenzene diazonium hexafluorophosphate | 260, 310 |
| 2,4,6-trichlorobenzene diazonium hexafluorophosphate | 294, 337 |
| 2,5-dichlorobenzene diazonium hexafluorophosphate | not reported |
| 2,4,6-trimethoxybenzene diazonium hexafluorophosphate | 302, 343 |
| p-methoxybenzene diazonium hexafluorophosphate | 313 |
| diphenyliodonium hexafluorophosphate | 230, 266, 273 |
| triphenylsulfonium hexafluorophosphate | 233, 267, 274 |
| bis[4-(diphenylsulfonio)phenyl] sulfide bis-hexafluorophosphate | 270, 278, 293, 310 |

When the two classes of photoinitiators are used in combination for preferred operation, the ratio of the auxiliary photoinitiators of Table Two to the primary photoinitiators of Table One is within the range of 0.5-4.0:1.0, and preferably 2.0-3.0:1.0. It will be apparent that curing of the compositions may be obtained by ratios outside this range, but, to effect reasonably rapid curing using conventional ultraviolet light sources and to obtain acceptable pot life under ambient white light conditions, this range is most advantageous.

The amount of the photoinitiator component may vary within a fairly wide range of 0.3-10 percent by weight of the composition, recognizing that at least about 0.3 percent by weight, based upon the polymerizable material, is generally necessary to initiate polymerization. To effect polymerization rapidly, the amount should comprise at least about 0.7 percent by weight of the polymerizable material. Although amounts of up to 7 percent by weight provide increasing reaction rate, amounts thereabove provide no significant additional benefit in reaction rate and often tend to deleteriously affect the physical properties of the polymer produced. Thus, a practical upper limit for the photoinitiator component is 10 percent by weight, based upon the weight of polymerizable material, and the preferred range is 1.0-4.0 percent.

The theory of operation resulting in the significant advantages of the combination of the two classes of photoinitiators is not fully understood. Some benefit could be expected in reduction of sensitivity to ambient white light by reducing the amount of the photoinitiator of Table One present in the composition; however, it would also be expected that there would occur some reduction in the rapidity of through curing and in the quality of the surface gloss by reducing the amount of photoinitiator able to be activated by radiation of the wavelength penetrating into the depths of the coating. As will be appreciated, the two classes of photoinitiators are uniformly dispersed throughout the depth of the coating and the light of the wavelength necessary to activate the photoinitiator of Table Two is strongly absorbed by the titanium dioxide. Accordingly, it could be expected that the curing rate within the depth of the coating would be adversely affected by the reduction in the amount of the first photoinitiator which was available to initiate curing within the depth of the coating. Significantly, it was found that through curing at a rapid rate and good glossy, wrinkle-free surfaces were obtained with the combination systems.

It is believed that the photodecomposition of the first photoinitiator by the radiation of longer wavelength penetrating into the depth of the coating and not absorbed by the titanium dioxide, in some manner stimulates the decomposition of the second photoinitiator within the depth of the coating, possibly by functioning as a photosensitizer. The overall cure rate and properties of the coatings obtained by use of the combination are superior to those resulting from either component alone and are indicative of a synergistic action.

Although only the compounds of Table One (and the related salts) have been found effective as the essential photoinitiator component, it is believed that a number of photoinitiators may be effective as the auxiliary photoinitiators in addition to those specifically set forth in Table Two, and their related salts. This is particularly true of the diazonium, iodonium and sulfonium salts.

Various diazonium salts are disclosed in the aforementioned Schlesinger and Watt Patents. Solution of suitable compounds may be effected within the parameters of the wavelength of light required for the effective photolysis.

The sulfonium salt photoinitiator may be of the tri(aryl/alkyl) type of the aforementioned Crivello U.S. Pat. No. 4,058,041 and Smith U.S. Pat. No. 4,069,054. The general formula for this class of photoinitiator is set forth in the aforementioned Crivello Patent:

where R is a monovalent aromatic organic radical; $R^1$ is a monovalent organic aliphatic radical selected from alkyl, cycloalkyl and substituted alkyl; $R^2$ is a polyvalent organic radical forming a heterocyclic or fused ring structure selected from aliphatic radicals and aromatic radicals; M is a metal or metalloid; Q is a halogen radical; a is a whole number equal to 0 to 3 inclusive; b is a whole number equal to 0 to 2 inclusive; c is a whole number equal to 0 or 1; and where the sum of a+b+c is a value equal to 3 or the valence of S; d=e−f; f=valence of M and is an integer equal to from 2 to 7 inclusive; and e is greater than f and is an integer having a value up to 8.

Exemplary of such sulfonium salt photoinitiators are the following: triphenylsulfonium tetrafluoroborate, methyldiphenylsulfonium tetrafluoroborate, dimethylphenylsulfonium hexafluorophosphate, triphenylsulfonium hexafluorophosphate, triphenylsulfonium hexafluoroantimonate, diphenylnaphthylsulfonium hexafluoroarsenate, tritolylsulfonium hexafluorophosphate, trifluoromethyldiphenylsulfonium tetrafluoroborate, and dimethylnaphthylsulfonium hexafluorophosphate. Additional compounds may be found in the aforementioned Crivello and Smith patents, as well as in Crivello et al. "Triaryl Sulfonium Salts: A New Class of Photoinitiators for Cationic Polymerization", JOURNAL OF RADIATION CURING, Volume 5, pages 2, 10–11, January 1978, and Pappas "UV CURING: SCIENCE AND TECHNOLOGY", (Technology Marketing Corporation, Stamford, Conn.).

The bis-type sulfonium salt photoinitiators related to those of the aforementioned Watt and Chang applications also may be employed as the auxiliary photoinitiator compounds and may have any one of the following general formulae:

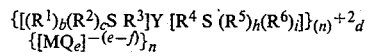       (I)

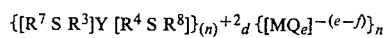       (II)

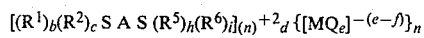       (III)

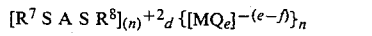       (IV)

wherein Y may be omitted or may be a bridging atom or group which connects $R^3$ and $R^4$, e.g., a divalent sulfur —S—, a divalent oxygen —O—, a divalent nitrogen

or a divalent carbon

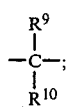

or a ketone group

wherein $R^2$ and $R^6$ are monovalent organic aliphatic radicals selected from alkyl, cycloalkyl and substituted alkyl; $R^1$ and $R^5$ are organic aromatic radicals which may or may not be ring-substituted; wherein $R^3$ and $R^4$ are organic aromatic radicals which may or may not be ring-substituted; wherein $R^7$ and $R^8$ are polyvalent organic radicals forming a heterocyclic or fused ring structure with the sulfur atom and may be the same or different; wherein $R^9$, $R^{10}$ and $R^{11}$ may be hydrogen, or substituted or unsubstituted alkyl or aryl groups; wherein A is equal to an aromatic ring system, either monocyclic or polycyclic, or a heterocyclic aromatic, monocyclic or polycyclic ring system, or an aromatic or heterocyclic ring system condensed with a cycloaliphatic ring system; wherein b and h may be equal to the integer 0, 1 or 2; wherein c and i may be equal to the integer 0, 1 or 2; wherein the sum of b+c, or of h+i, is 2; wherein d=½ (e−f) and n is the multiplier of d necessary to produce a whole number; wherein f=the valence of M and is an integer from 2–7 inclusive; wherein e is greater than f and is an integer having a value up to 8.

Simple methods for making such salts are described in the aforementioned U.S. applications of Watt and Chang. Exemplary of this class of sulfonium salt photoinitiators are bis-[4-(diphenylsulfonio) phenyl] sulfide bis-hexafluorophosphate; bis-[4-(diphenylsulfonio) phenyl] ether bis-hexafluorophosphate; bis-[4-(diphenylsulfonio) phenyl] ketone bishexafluorophosphate; bis-[4-(tetramethylenesulfonio) phenyl] sulfide bishexafluorophosphate; bis-[4-(tetramethylenesulfonio) phenyl] sulfide bistetrafluoroborate; and bis-[4-(diphenylsulfonio) phenyl] sulfide chlorostannate.

The diaryl iodonium salts which may be used as the auxiliary photoinitiator compounds are described in detail in Crivello U.S. Pat. No. 4,026,705 granted May 31, 1977. Such compounds have the general structural formula

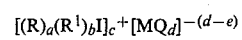

where R is a monovalent aromatic organic radical, $R^1$ is a divalent aromatic organic radical, M is a metal or metalloid, Q is a halogen radical, a is a whole number equal to 0 or 2, b is a whole number equal to 0 or 1, the sum of a and b is equal to 2 or the valence of I, c=d−e, e=valence of M and is an integer equal to 2 to 7 inclusive, and d is greater than e and is an integer having a value up to 8.

It will be appreciated that a number of aryl diazonium salts, diaryl diazonium salts, diaryl iodonium salts, aryl-/alkylsulfonium salts and bis-(aryl/alkyl)sulfonium salts may be employed as the auxiliary photoinitiator compounds so long as they demonstrate the desired compatibility with the primary photoinitiator compounds and exhibit sensitivity to ultraviolet radiation at about 200–355 nanometers.

The photoinitiators of the present invention will decompose upon exposure to ultraviolet radiation so as to provide a Lewis acid which is effective to initiate polymerization of the cationically polymerizable material. The term "Lewis acid" as used herein is intended to encompass compounds produced by decomposition and which will directly or indirectly receive an electron pair from the monomer to initiate polymerization, as for example from the oxygen of the oxirane ring to open the oxirane ring. The classic Lewis Acid precursor decomposition mechanism is described in the aforementioned Watt U.S. Pat. No. 3,794,576 with respect to a diazonium salt initiator. As is well known, the term "Lewis acid" in its broad scope includes protonic or Bronsted acids.

The decomposition mechanism for triarylsulfonium salts to provide an indirectly formed Lewis Acid has been postulated by Crivello et al. in "Triarylsulfonium Salts: A New Class of Photoinitiators for Cationic Polymerization" in JOURNAL OF RADIATION CURING, Vol. 5, page 2 (January 1978). The authors postulate that the decomposition of the diaryl- and triarylsulfonium salts produces a Bronsted acid which in turn provides a proton which will function as the Lewis Acid to accept electrons from an oxygen of an oxirane ring in an epoxide monomer and initiate polymerization in accordance with the following mechanism, as shown in equations (1)–(3):

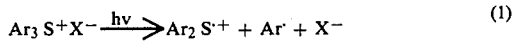  (1)
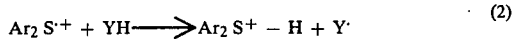  (2)
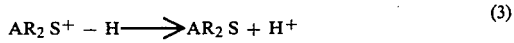  (3)

Regardless of the theory of the activating action embraced, it is apparent that the photoinitiator is decomposing to generate in the reaction medium an electron acceptor acting as a Lewis acid to open an oxirane ring in an epoxide compound or otherwise accepting an electron pair from other cationically polymerizable monomers and thereby initiating cationic polymerization of the monomer material. The reaction then proceeds as additional monomer units are activated until all of the monomer has been polymerized or until impurities interfere with the reaction mechanism.

As indicated, the photoinitiator component is decomposed into a Lewis acid by exposure to ultraviolet radiation having a wavelength range of 200–400 nanometers. The exposure to radiation normally required may be of extremely short duration, periods of about two to ten seconds being normally adequate for most compositions depending upon the intensity of the radiation at the surface. However, for relatively thick deposits of the composition, it may be desirable to extend the period of exposure to twenty seconds, to ensure adequate penetration of the radiation through the depth of the coating.

Titanium Dioxide Pigment

The titanium dioxide is incorporated in finely divided particulate or pulverulent form, generally within a particle size range of about 100 to 400 nanometers. The preferred titanium dioxide pigments are surface treated with a stabilizer to improve their dispersability; conventionally, such stabilizers are oxides or hydrated oxides of silicon, magnesium or aluminum, or they are amines or other organic compounds. As described in the aforementioned Tarwid U.S. Pat. No. 4,054,498, the preferred titanium dioxide pigments are those which are treated with alumina in the fashion set forth therein with the coating generally comprising about 1–10 percent by weight of the titanium dioxide.

Although the titanium dioxide may have other crystalline forms, the rutile form is most beneficially employed and is readily available commercially as the coated material.

The amount of the titanium dioxide within the polymerizable composition may vary widely depending upon the desired opacity with amounts as low as 10 percent providing a useful white coloration. However, generally it is necessary to incorporate about 25 percent or more to achieve the highly desirable opacity required for economical thin coatings. At a level above 45 percent, the properties of the coatings are adversely affected. Thus, the titanium dioxide is incorporated in the broad range of 10–45 percent by weight of the composition, and preferably 25–40 percent.

To facilitate dispersion of the pigment within the remaining components of the composition, it is advantageous to premix the pigment with a portion of the polymerizable material to produce a slurry which is then admixed with the remaining components.

Other Components and Factors

For some applications, the composition may contain a dye to provide a desired coloration or small amounts of a filler in addition to the titanium dioxide pigment. Flow agents, gelation inhibitors and other additives known in the art may be included in minor amounts depending upon the intended application. However, they are not essential but optional.

Although controlled application of heat to the photopolymerizable compositions has been found advantageous in permitting the elimination of the epoxycycloalkyl esters of the Watt Patent and the special epoxide ethers of the aforementioned Tortorello applications, heat may be disadvantageous at times in white pigmented coating compositions of the present invention. Accordingly, the processes of the present invention utilize, and the preferred compositions provide, ambient temperature curing solely upon ultraviolet activation.

The compositions of the present invention are particularly useful for making durable coatings for either aesthetic or protective purposes. The epoxide compositions find particular advantage in the field of graphic arts because of the resistance of the coating to solvents and chemicals as well as to abrasion, because of the excellent adhesion to various surfaces including metals, and because of the ability to withstand drawing and forming operations. Generally, this will require a coating of 0.2–1.0 mil thickness and preferably 0.5–0.8 mil.

Illustrative of the efficacy of the present invention are the following examples wherein all parts are by weight unless otherwise indicated. In all examples, the titanium dioxide was ground to a fineness equivalent to No. 7+ on a Hegeman gauge.

EXAMPLE ONE

To test various photoinitiators of the classes set forth in Table One and Table Two for ability to produce white coating compositions having acceptable ambient white light stability and rapid through curing characteristics upon exposure to ultraviolet light, the following basic coating formulation is prepared:

| Component | Parts |
|---|---|
| titanium dioxide (sold by American Cyanamid under the designation UNITANE OR600) | 33.86 |
| 3,4-epoxy cyclohexylmethyl-3,4-cyclohexanecarboxylate (sold by Ciby-Geigy under the designation CY-179) | 40.63 |
| butanediol diglycidyl ether (sold by Ciba-Geigy under the designation RD-2) | 13.64 |
| butyl glycidyl ether (sold by Ciba-Geigy under the designation RD-1) | 7.07 |
| silicone resin flow agent (sold by General Electric under the designation SR-82) | 3.54 |
| anionic dispersing agent (sold by Monsanto Company under the designation B-76) | 0.76 |

-continued

| Component | Parts |
|---|---|
| anionic dispersing agent (sold by Byk-Malinckrodt under the designation BYK P-104) | 0.51 |

The anionic dispersing agent (B-76) is initially dissolved in the butyl glycidyl ether at 55° C. and 16.9 parts of 3,4-epoxy cyclohexylmethyl-3,4-cyclohexanecarboxylate is initially admixed with the titanium dioxide to form a slurry which is ground on a 3-roll mill to the specified fineness. To aliquots of this basic formulation are added various photoinitiator components to evaluate their effectiveness. The photoinitiators are provided as 33 percent by weight solutions of the photoinitiator in sulfolane or propylene carbonate as a solvent. The photoinitiator solution provides $2.55 \times 10^{-3}$ gram mole photoinitiator per 100 gram aliquots of the basic coating formulation.

The various formulations are then coated onto the substrate using a #10 wire wound rod to provide a coating of 40 milligrams weight per 4 square inches substrate. The substrates employed are aluminum panels.

Following coating, the panels are exposed of a 360 watt ultraviolet arc lamp providing about 60 watts per usable inch of lamp length and at a spacing of 2 inches therefrom. The period of exposure in this test is 10–15 seconds, following which the coated specimens are immediately withdrawn and tested for tackiness by pressing a finger against the coating. If no imprint is observed, the coating is considered to be cured. The surface of the panels is also inspected for evidence of orange peel or wrinkling effect. The various photoinitiators tested and the results observed are set forth in the following tables:

| Photoinitiator | Cure Rate | Appearance |
|---|---|---|
| 2,5-diethoxy-4-p-tolylmercaptobenzene diazonium hexafluorophosphate | fully cured | hard, glossy |
| 4-chloro-2,5-dimethoxybenzene diazonium hexafluorophosphate | fully cured | hard, glossy |
| 2,5-dimethoxybenzene diazonium hexafluorophosphate | fully cured | hard, glossy |
| 2,5-dimethoxy-4-p-tolylbenzene diazonium hexafluorophosphate | fully cured | hard, glossy |
| 2,5-dibutoxy-4-benzamidobenzene diazonium hexafluorophosphate | fully cured | hard, glossy |
| 2,4-dimethoxybenzene diazonium hexafluorophosphate | tacky | dull, wrinkled |
| 3,4,5-trimethoxybenzene diazonium hexafluorophosphate | tacky | dull, wrinkled |
| o-methoxybenzene diazonium hexafluorophosphate | tacky | dull, wrinkled |
| 2-methyl-4-methoxybenzene diazonium hexafluorophosphate | tacky | dull, wrinkled |
| 3,4-methylenedioxybenzene diazonium hexafluorophosphate | tacky | dull, wrinkled |
| 2-methyl-4-nitrobenzene diazonium hexafluorophosphate | tacky | dull, wrinkled |
| 5-chloro-2,4-dimethoxybenzene diazonium hexafluorophosphate | tacky | dull, wrinkled |
| 2-carboxymethylbenzene diazonium hexafluorophosphate | tacky | dull, wrinkled |
| 2,4,6-trichlorobenzene diazonium hexafluorophosphate | tacky | dull, wrinkled |
| 2,5-dichlorobenzene diazonium hexafluorophosphate | tacky | dull, wrinkled |
| 2,4,6-trimethoxybenzene diazonium hexafluorophosphate | tacky | dull, wrinkled |
| p-methoxybenzene diazonium hexafluorophosphate | tacky | dull, wrinkled |
| diphenyliodonium hexafluorophosphate | tacky | dull, wrinkled |
| triphenylsulfonium hexafluorophosphate | tacky | dull, wrinkled |

Thus, it can be seen that only those photoinitiators previously identified in Table One are effective to cure the coating to the desired tack-free, hard, glossy condition, while those identified in Table Two do not effect the desired curing although they are effective to do so in compositions which do not contain titanium dioxide. However, compositions using the photoinitiators of Table One are found to evidence varying degrees of premature gelation upon exposure to ambient white light for periods of at least one hour.

EXAMPLE TWO

In this example, several combinations of photoinitiators from Table One with those from Table Two are tested in the basic coating formulation of Example One. The total moles of photoinitiator component are the same as in Example One and the coating procedure is as defined therein.

| Photoinitiator | Formulations | | |
|---|---|---|---|
| | I | II | III |
| 2,5-diethoxy-4-p-tolylmercaptobenzene diazonium hexafluorophosphate, mole ($\times 10^{-3}$) | — | 0.851 (0.392 g) | 0.510 (0.235 g) |
| 2,5-dimethoxybenzene diazonium hexafluorophosphate, mole ($\times 10^{-3}$) | 0.845 (0.262 g) | — | — |
| p-methoxybenzene diazonium hexafluorophosphate, mole ($\times 10^{-3}$) | 1.70 (0.475 g) | 1.703 (0.477 g) | 2.04 (0.571 g) |
| sulfolane, g. | 1.474 | 1.738 | 1.612 |
| acetonitrile, g. | — | 0.231 | — |

In each instance, the coating is found to cure to a nontacky, glossy surface immediately following the exposure to the activating radiation. A gloss value of 95–100 is obtained on a Hunter Lab Model D-16 gloss meter using a 20° reflection angle setting. The coatings resist rubbing with a pad saturated with methyl ethyl ketone.

Coating on test panels of Formulations I and III are exposed to ambient fluorescent light for a period of 6 hours and remain uncured. After 24 hours, the coatings are still tacky and are readily removed by light rubbing with a pad saturated with methyl ethyl ketone.

In contrast with the results obtained above, the same formulation using as the photoinitiator component only 0.714 gram p-methoxybenzene diazonium hexafluorophosphate in 1.428 grams sulfolane ($2.55 \times 10^{-3}$ mole) gives a dull, incompletely cured coating after 10 seconds exposure to the ultraviolet light source and requires exposure for a period of 15-20 seconds to effect curing to the same extent.

Another test formulation is made containing as the photoinitiator component 1.174 gram ($2.55 \times 10^{-3}$ mole) 2,5-diethoxy-4-p-tolymercaptobenzene diazonium hexafluorophosphate in 2.348 grams propylene carbonte. This formulation provides a coating which cures within 5 seconds exposure to the ultraviolet light source to a glossy coating. However, a coated panel exposed to ambient white light begins to cure within one hour and is fully cured within three hours.

EXAMPLE THREE

The effectiveness of combinations of the preferred photoinitiator systems was evaluated in several different epoxide formulations. The titanium dioxide is added in a slurry containing 66.56 percent titanium dioxide, 32.47 percent 3,4-epoxy cyclohexylmethyl-3,4-cyclohexanecarboxylate, and 0.974 percent anionic dispersing agent (sold by monsanto under the designation B-76). The methods of coating, irradiation and testing are as set forth in Examples One and Two. Two different photoinitiator systems are employed in each of the coating compositions. The first is a 2:1 ratio of p-methoxybenzene diazonium hexafluorophosphate to 2,5-dimethoxybenzene diazonium hexafluorophosphate in sulfolane as a solvent (referred to in the Table as "A") and the second is a 2:1 ratio of 2,4-dimethoxybenzene diazonium hexafluorophosphate to 2,5-dimethoxybenzene diazonium hexafluorophosphate in sulfolane as the solvent (referred to in the table as "B").

EXAMPLE FOUR

Polymerizable epoxide formulations in accordance with the present invention are tested on a pilot plant prototype of a commercial coating line. The formulation corresponds to that set forth in Example Three, Formulation I, and 2 aliquots are utilized, one containing the 1-methyl-2-pyrrolidone as a gelation inhibitor and the other containing no gelation inhibitor. The catalyst system is 2.210 grams of the 2:1 molar mixture of p-methoxybenzene diazonium hexafluorophosphate and 2,5-dimethoxybenzene diazonium hexafluorophosphate. Two-piece beer cans formed from steel electroplated with tin are coated with the formulations and exposed to ultraviolet light as they are passed on a conveyor at a speed of 100 cans per minute through three adjacent exposure zones in each of which there is provided a 200 watt/inch high pressure Hanovia mercury arc lamp surrounded by aluminum reflectors. In this pilot plant installation, it is possible to vary the amount of ultraviolet light used to activate the coating from one-half lamp power to full power of all three lamps, and various specimens are exposed to various levels of possible exposure throughout the full range.

The cans coated with the formulation containing no gelation inhibitor have a coating weight of 310-413 milligrams per can and are fully cured to a glossy white coating in passes throughout the full range of one-half lamp power to full three lamp power. After a post baking cycle at 400° F. for 4 minutes followed by pasteurization in water at 150° F. for 20 minutes, the coating passes an adhesion test in which a pressure sensitive tape is pressed thereagainst and then stripped.

| Component | Formulation | | | | |
|---|---|---|---|---|---|
| | I | II | III | IV | V |
| titanium dioxide slurry (formulated as described above) | 50.36 | 50.20 | 51.42 | 51.42 | 52.11 |
| 3,4-epoxy cyclohexylmethyl-3,4-cyclohexanecarboxylate (sold by Ciby-Geigy under the designation CY-179) | 25.64 | 13.99 | 3.27 | 3.27 | — |
| butyl glycidyl ether (sold by Ciba-Geigy under the designation RD-1) | 6.95 | — | — | — | — |
| butanediol diglycidyl ether (sold by Ciba-Geigy under the designation RD-2) | 13.41 | 30.70 | 21.46 | 21.46 | 23.28 |
| low molecular weight Bis-phenol A-based epoxy resin (sold by Ciba-Geigy under the designation ARALDITE 6004) | — | — | 19.95 | 19.95 | — |
| low molecular weight Bis-phenol A-based epoxy resin (sold by Ciba-Geigy under the designation ARALDITE 6010) | — | — | — | — | 20.78 |
| fluorocarbon flow agent (sold by 3M under the designation FC-430) | 0.173 | 0.172 | 0.172 | 0.172 | 0.173 |
| fluorocarbon flow agent (sold by 3M under the designation FC-433) | — | 0.312 | 0.307 | — | — |
| silicone resin flow agent (sold by General Electric under the designation SR-82) | 3.48 | 4.62 | 3.42 | 3.42 | 3.72 |
| 1-methyl-2-pyrrolidone (gelation inhibitor) | 0.0336 | 0.0329 | 0.0331 | 0.0331 | 0.0329 |
| photoinitiator A | 2.210 | 2.210 | 2.210 | 2.210 | 2.210 |
| photoinitiator B | 2.366 | 2.366 | 2.366 | 2.366 | 2.366 |

Upon irradiation, it is found that all of the coating formulations produced a glossy white base coating which is nontacky on aluminum or tin-free steel panels.

The cans coated with the formulation which contain the gelation inhibitor are found to have a coating weight of 345-360 milligrams per can and exhibit a smooth, glossy white cured coating in the passes down to two lamps power.

Although both coating formulations are handled in ambient white light for up to three hours, there is no apparent evidence of gelation or thickening during this period.

EXAMPLE FIVE

Additional photoinitiators alone and in combination are tested to determine their suitability in the compositions and processes of the present invention. The basic coating formulation is one in which the titanium dioxide is added as a slurry comprised of 33.90 percent of titanium dioxide, 16.54 percent 3,4-epoxy cyclohexylmethyl-3,4-cyclohexanecarboxylate, and 0.992 percent anionic dispersing agent sold by Byk-Malinckrodt under the designation BYK P-104, the foregoing percentages being based upon the weight of the basic coating formulation, which is as follows:

| Component | Amount, grams |
|---|---|
| pigment slurry | 51.43 |
| butanediol diglycidyl ether (sold by Ciba-Geigy under the designation RD-2) | 21.46 |
| low molecular weight Bis-phenol A-based epoxy resin (sold by Ciba-Geigy under the designation ARALDITE 6004) | 23.22 |
| silicone resin flow agent (sold by General Electric under the designation SR-82) | 3.42 |
| 1-methyl-2-pyrrolidone | 0.030 |

To this basic formulation are added various photoinitiator components as shown in the following table. In all instances, the photoinitiator compounds are added as 33.3 percent solutions, with the solvent being sulfolane except for the combination of triphenylsulfonium hexafluorophosphate and 2,5-dibutoxy-4-benzamidobenzene diazonium hexafluorophoshate which utilizes propylene carbonate. The molar ratios of the combination systems are set forth in the table.

The coating compositions are applied to tin-free steel and aluminum specimens using a No. 10 wire wound rod, and the coated panels are exposed to 60 watt/inch UVIARC ultraviolet lamps at a distance of two inches. The minimum time of ultraviolet exposure to effect curing to a tack-free surface condition and the appearance of the cured coatings are noted.

| Photoinitiator Component | Wt. of Solution Added | Min. UV Exposure to Cure | Appearance of Cured Coating |
|---|---|---|---|
| triphenylsulfonium hexafluorophosphate | 4.378 | 15 sec. | dull, wrinkled |
| diphenyliodonium hexafluorophosphate | 4.522 | 20 sec. | dull, wrinkled |
| 2:1.5 triphenylsulfonium hexafluorophosphate and 2,5-dimethoxybenzene diazonium hexafluorophosphate | 3.054 | 15 sec. | glossy |
| 2:1.5 triphenylsulfonium hexafluorophosphate and 2,5-dibutoxy-4-benzamidobenzene diazonium hexafluorophosphate | 3.800 | 15 sec. | glossy |
| 2:1.5 diphenyliodonium hexafluorophosphate and 2,5-dimethoxybenzene diazonium hexafluorophosphate | 3.200 | 20 sec. | glossy |

EXAMPLE SIX

Two coating formulations of the type set forth in Example Five are prepared, the first containing 4.36 parts of a 25% solution of 2,4,6-trimethoxybenzene diazonium hexafluorophosphate in propylene carbonate and the second containing 2.848 parts of a 29.7 solution of 2,4,6-trimethoxybenzene diazonium hexafluorophosphate and 2,5-dimethoxybenzene diazonium hexafluorophosphate in a 2:1 molar ratio.

The specimens are coated with the formulations and placed at a distance of two inches from a 60 watt/inch UVIARC lamp and the time to cure to a tack-free surface condition is noted. The coating formulation containing 2,4,6-trimethoxybenzene diazonium hexafluorophosphate alone requires 20 seconds for curing and exhibits a wrinkled surface appearance, whereas the coating formulation containing the combination photoinitiator system requires only 15 seconds exposure and cures to a glossy finish.

Thus, it can be seen from the foregoing detailed specification and examples that the photoinitiatable cationically polymerizable white pigmented epoxide coating compositions of the present invention rapidly cure upon exposure to activating electromagnetic radiation in the ultraviolet light wavelength. The preferred compositions utilizing a combination photoinitiator system evidence greatly reduced tendencies toward premature curing under ambient white light. As a result, these compositions are relatively stable during extended periods of storage but will polymerize rapidly to produce coatings with desirable mechanical properties and high gloss. The polymerization processes employing these new compositions are readily adaptable to a wide variety of high speed coating lines and do not require extensive or expensive equipment to effect photopolymerization of the applied coatings.

Having thus described the invention, I claim:

1. In an epoxide coating composition, the combination comprising:
   A. 54.7–89.7 percent by weight of a cationically polymerizable material consisting at least principally of an epoxide prepolymer;
   B. 10–45 percent by weight of titanium dioxide pigment; and
   C. 0.3–10.0 percent based upon the weight of said polymerizable material, of a photoinitiator component relatively stable to ambient white light but readily decomposable upon exposure to ultraviolet light to provide a Lewis acid to effect polymerization of said cationically polymerizable material, said photoinitiator component including: a first photoinitiator compound comprising an aryldiazonium salt wherein the aryldiazonium group is selected from the class consisting of 2,5-diethoxy-4-p-tolylmercaptobenzene diazonium, 4-chloro-2,5-dimethoxybenzene diazonium, 2,5-dimethoxybenzene diazonium, 2,5-dimethoxy-4-p-tolylbenzene diazonium and 2,5-dibutoxy-4-benzamidobenzene diazonium, and mixtures thereof, and wherein the salt group is selected from the class consisting of hexafluorophosphates, fluoroborates, fluoroantimonates and fluoroarsenates, and mixtures thereof; and a second photoinitiator compound relatively stable to ultraviolet radiation having a wavelength of at least 355 nanometers and decomposable by ultraviolet radiation having a wavelength of 200–355 nanometers.

2. The epoxide coating composition of claim 1 wherein said second photoinitiator compound is selected from the class consisting of aryldiazonium salts, diaryldiazonium salts, alkyl/aryldiazonium salts, diaryliodionium salts, alkyl/arylsulfonium salts and bis-(aryl/alkylsulfonium) bis-salts and wherein the salt groups are as set forth for said first photoinitiator.

3. The epoxide coating composition of claim 1, wherein said second photoinitiator compound is present in a molar ratio relative to said first photoinitiator compound of 0.5–4.0:1.0.

4. The epoxide coating composition of claim 1 wherein said polymerizable material includes at least about 25 percent by weight of an epoxide ether having the following structural formula:

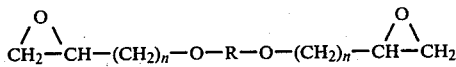

wherein n=1–3 and wherein R is an aliphatic or cycloaliphatic group having 5–12 carbon atoms.

5. The epoxide coating composition of claim 1 wherein said polymerizable material includes at least about 25 percent by weight of an epoxycarbocyclic ether having the structural formula:

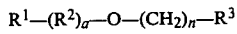

wherein $R^1$ is an epoxycarbocyclic group having 4–12 carbon atoms in its ring structure which may be mononuclear or polynuclear; wherein $R^2$ is a $C_1$–$C_3$ alkyl group; wherein $R^3$ may be the same as $R^1$ or an epoxy group having the following general structural formula:

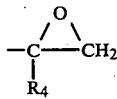

wherein $R^4$ may be hydrogen, a $C_1$–$C_3$ alkyl group or a phenyl group, and such alkyl and phenyl groups may be substituted or unsubstituted; wherein a=0 or 1; and wherein n=1–3.

6. The epoxide coating composition of claim 1 wherein said polymerizable material includes at least about 25 percent by weight of an epoxidic ester having at least two epoxycycloalkyl groups.

7. The epoxide coating composition of claim 1 wherein said titanium dioxide pigment is rutile titanium dioxide particles coated with aluminum oxide.

8. In the method of producing a glossy adherent white coating upon a substrate, the steps comprising:
  A. admixing to form a polymerizable epoxide composition:
    (i) 54.7–89.7 percent by weight of a cationically polymerizable material consisting at least principally of an epoxide prepolymer;
    (ii) 10–45 percent by weight of titanium dioxide pigment; and
    (iii) 0.3–10.0 percent based upon the weight of said polymerizable material, of a photoinitiator component relatively stable to ambient white light but readily decomposable upon exposure to ultraviolet light to provide a Lewis acid to effect polymerization of said cationically polymerizable material, said photoinitiator component including: a first photoinitiator compound comprising an aryldiazonium salt wherein the aryldiazonium group is selected from the class consisting of 2,5-diethoxy-4-p-tolylmercaptobenzene diazonium, 4-chloro-2,5-dimethoxybenzene diazonium, 2,5-dimethoxybenzene diazonium, 2,5-dimethoxy-4-p-tolylbenzene diazonium and 2,5-dibutoxy-4-benzamidobenzene diazonium, and mixtures thereof, and wherein the salt group is selected from the class consisting of hexafluorophosphates, fluoroborates, fluoroantimonates and fluoroarsenates, and mixtures thereof; and a second photoinitiator compound relatively stable to ultraviolet radiation having a wavelength of at least 355 nanometers and decomposable by ultraviolet radiation having a wavelength of 200–355 nanometers;
  B. applying said polymerizable composition to a substrate to develop a coating of the desired thickness thereon; and
  C. exposing said coating to ultraviolet radiation to produce photolysis of said photoinitiator component to generate a Lewis acid and polymerize the epoxide composition within one minute to a hard glossy surface which is tack-free.

9. The method of producing a white coating in accordance with claim 8 wherein said second photoinitiator compound is selected from the class consisting of aryldiazonium salts, diaryldiazonium salts, diaryliodionium salts, alkyl/aryldiazonium salts, alkyl/arylsulfonium salts and bis-(aryl/alkylsulfonium) bis-salts and wherein the salt groups are as set forth for said first photoinitiator.

10. The method of producing a white coating in accordance with claim 8 wherein said second photoinitiator compound is present in a molar ratio relative to said first photoinitiator compound of 0.5–4.0:1.0.

11. The method of producing a white coating in accordance with claim 8 wherein said polymerizable material includes at least about 25 percent by weight of an epoxide ether having the following structural formula:

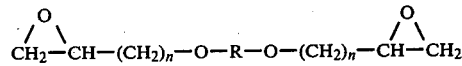

wherein n=1–3 and wherein R is an aliphatic or cycloaliphatic group having 5–12 carbon atoms.

12. The method of producing a white coating in accordance with claim 8 wherein said polymerizable material includes at least about 25 percent by weight of an epoxycarbocyclic ether having the structural formula:

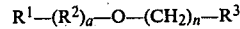

wherein $R^1$ is an epoxycarbocyclic group having 4–12 carbon atoms in its ring structure which may be mononuclear or polynuclear; wherein $R^2$ is a $C_1$–$C_3$ alkyl group; wherein $R^3$ may be the same as $R^1$ or an epoxy group having the following general structural formula:

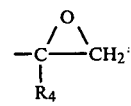

wherein $R^4$ may be hydrogen, a $C_1$–$C_3$ alkyl group or a phenyl group, and such alkyl and phenyl groups may be substituted or unsubstituted; wherein a=0 or 1; and wherein n=1-3.

13. The method of producing a white coating in accordance with claim 8 wherein said polymerizable material includes at least about 25 percent by weight of an epoxidic ester having at least two epoxycycloalkyl groups.

14. The method of producing a white coating in accordance with claim 8 wherein said titanium dioxide pigment is rutile titanium dioxide particles coated with aluminum oxide.

15. The method of producing a white coating in accordance with claim 8 wherein said coating is exposed to ultraviolet radiation in the range of 200-400 nanometers for a period of two to twenty seconds.

* * * * *